United States Patent [19]
Shellhause

[11] 3,794,147
[45] Feb. 26, 1974

[54] BOOT AND CONTROL MECHANISM

[75] Inventor: Ronald L. Shellhause, Dayton, Ohio

[73] Assignee: General Motors Corporation, Detroit, Mich.

[22] Filed: Dec. 5, 1972

[21] Appl. No.: 312,333

Related U.S. Application Data

[62] Division of Ser. No. 217,805, Jan. 14, 1972, Pat. No. 3,735,067.

[52] U.S. Cl............ 192/3 G, 200/61.86, 200/61.89
[51] Int. Cl........................................... F16d 23/00
[58] Field of Search ....... 192/3 G; 200/61.86, 61.89

[56] References Cited
UNITED STATES PATENTS

| | | | |
|---|---|---|---|
| 2,671,542 | 3/1954 | Robnett, Jr........................ | 192/3 G |
| 3,298,482 | 1/1967 | Mueller et al. ................... | 192/3 G |
| 3,443,044 | 5/1969 | Wintriss........................... | 200/61.86 |

Primary Examiner—Benjamin W. Wyche
Assistant Examiner—Randall Heald
Attorney, Agent, or Firm—D. D. McGraw

[57] ABSTRACT

A power brake assembly has a boot through which the brake pedal operated push rod extends to control the power brake. Instead of the usual flexible convoluted rubber boot, the boot is made of two housings forming tubes or cylinders, one slidably located within the other, with the power brake piston extension containing the atmospheric air inlet filter extending into the inner housing. A switch mechanism is provided in the outer housing and includes a biasing spring acting on a switch contact carrier. The inner housing has a probe which engages the contact carrier so that in one slidable position of the inner housing relative to the outer housing the contact carrier is urged into position relative to other switch contacts so that the switch or switches comprising the switch mechanism have assumed positions, either open or closed, as desired. This occurs when the power brake piston has moved in the brake apply direction. When the power brake piston moves to the brake release position, the probe on the inner housing moves the contact carrier against the spring, changing the operational status positions of the switches. A vacuum control valve arrangement is also provided so that a port is closed or connected to atmosphere depending upon the position of the inner housing relative to the outer housing, if such a vacuum control is needed as, for example, in conjunction with a road speed control device.

2 Claims, 3 Drawing Figures

PATENTED FEB 26 1974  3,794,147

BOOT AND CONTROL MECHANISM

This is a division of U.S. application Ser. No. 217,805, entitled "Boot and Control Mechanism" now U.S. Pat. No. 3,735,067, filed Jan. 14, 1972.

The invention relates to a control mechanism, and more particularly to one which provides a brake booster boot and various control devices related to brake operation in an integrated assembly. Control devices commonly found in automotive vehicles which require the sensing of brake application and release include a switch to activate and deactivate the vehicle brake lights, a switch to deactivate a road speed control system when the brakes are applied, and a normally closed vacuum control port for the road speed control system which acts as a back-up for deactivation of the system when the brakes are applied by opening the system vacuum circuit to atmospheric air. The mechanism embodying the invention permits the provision of multiple control functions in an inexpensive and reliable unit, without requiring any close tolerances. The normal operation of the power brake booster, and in particular the forward movement of the booster piston, is utilized for control purposes without requiring modification of boosters commonly available at this time.

IN THE DRAWING

Figure 1:
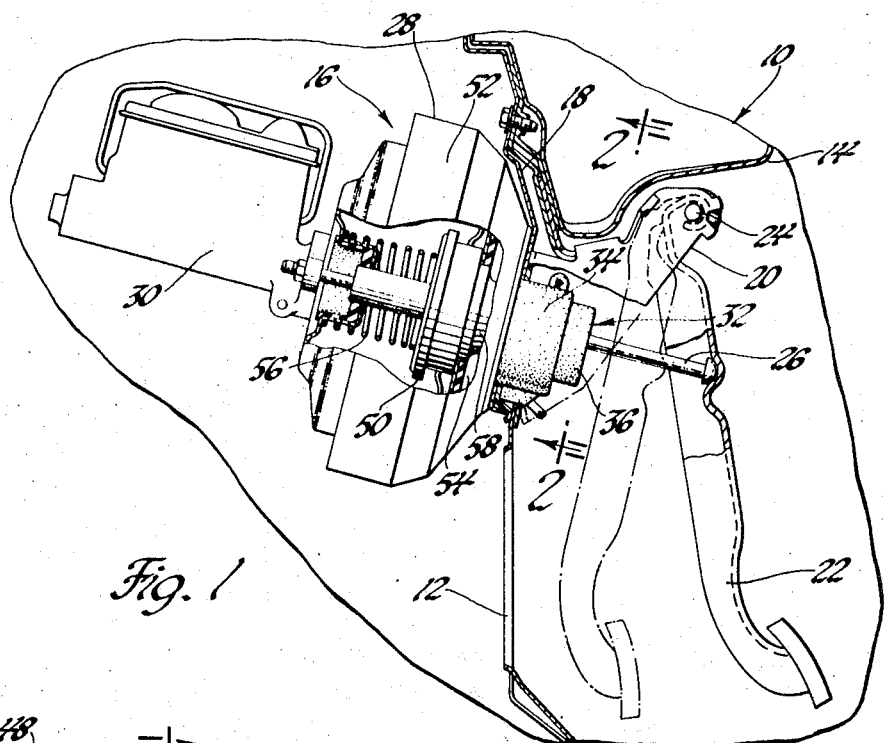
FIG. 1 is a fragmentary elevation view of a portion of an automotive vehicle showing the brake control mechanism including the boot and control mechanism embodying the invention, with parts broken away and in section.

The fragmentary portions of the vehicle 10 illustrated in FIG. 1 include the firewall 12; the instrument panel 14; and the modular brake control assembly 16 which includes its mounting plate 18, mounting bracket 20, brake pedal and lever arm 22 which is pivoted at 24 on bracket 20, push rod 26, power brake booster 28 and the master cylinder assembly 30. The mounting plate 18 supports the other parts of the modular brake control assembly on the firewall 12.

Figure 2:
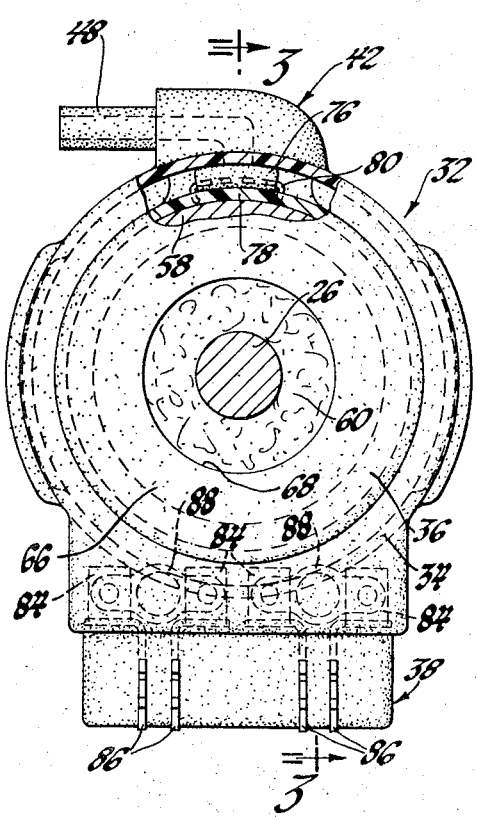
FIG. 2 is a view of the boot and control mechanism taken in the direction of arrows 2—2 of FIG. 1, with parts broken away and in section.

The boot and control mechanism 32 is suitably secured to the booster housing and receives the push rod 26 therethrough. As more particularly shown in FIGS. 2 and 3, the mechanism 32 includes an outer housing 34, an inner housing or piston 36 which is slidably received within the outer housing, a switch mechanism 38 mounted in a switch chamber 40 formed in a portion of the outer housing 34, and control valve means 42, which includes a passage 44 terminating in a port 46 opening to the interior of the outer housing 34 and providing a connection 48 at the other end of the passage to which suitable tubing may be connected. When the vehicle is equipped with a vacuum powered road speed control system, the tubing connected to connection 48 is a part of that system.

Figure 3:
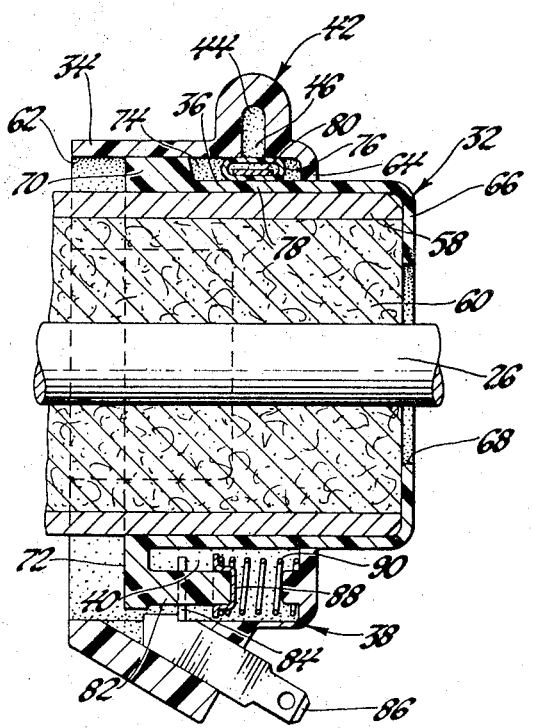
FIG. 3 is a cross-section view of the boot control mechanism of FIG. 2 taken in the direction of arrows 3—3 of that FIG.

The brake booster 28 is shown in FIG. 1 as having a power piston 50 which moves within the booster housing 52 to control operation of the master cylinder 30, the movement of piston 50 in turn being controlled by the admission of vacuum and atmospheric air to the variable pressure chamber 54 on one side of the piston 50 under control of a valve mechanism actuated by movement of the push rod 26. The return spring 56 urges the piston 50 rearwardly to the normal brake release position. The piston extension 58 extends rearwardly through chamber 54 and is shown in FIG. 3 as being slidably received within the inner housing 36. This portion of the piston extension contains a suitable air filter 60 through which push rod 26 extends and which filters atmospheric air admitted to chamber 54.

The outer housing 34 has a bore 62 into which port 46 opens. A lip 64 extends radially inward from one end of housing 34 and guides the movements of inner housing 36 as the inner housing moves axially during brake application and release. The portion of inner housing 36 extending outwardly of outer housing 34 beyond lip 64 terminates in an inwardly turned flange or abutment 66 which has a center opening 68 which is radially spaced well away from push rod 26 to permit some pivotal freedom of movement of the push rod, the material of which filter 60 is made being sufficiently flexible and resilient to permit this action. The rear end of piston extension 58 normally abuts the abutment 66 as shown in FIG. 3, although it may move away from the abutment when the stroke of the piston in the brake apply direction is greater than the axial movement of inner housing 36. Inner housing 36 also has flange sections formed on its other end opposite abutment 66, the flange sections 70 and 72 extending radially outward to slidably engage bore 62 of outer housing 34. Flange section 70 is positioned axially adjacent but spaced from port 46 and lip 64 to provide a control valve chamber 74 between the inner and outer housings and between flange section 70 and lip 64. Port closing means, illustrated as a flattened tube 76, is suitably positioned on the main body section 78 of the inner housing 36 so as to close port 46 when the brake booster is in the brake release position. A clip 80 extending through tube 76 may be used to fasten the tube to main body section 78 so that the tube moves axially of bore 62 with axial movement of the inner housing 36.

The flange section 72 has a probe 82 extending into the switch chamber 40 of switch mechanism 38. The switch mechanism has a contact plate 84 positioned to engage terminals 86, which are mounted in a boss formed as a part of the outer housing 34. A contact carrier 88 is slidably positioned in chamber 40, urged toward contact plate 84 by resiliently yielding spring 90, and engages probe 82. Suitable contacts are provided on the plate 84 and carrier 88 to open and close in accordance with movements of carrier 88 relative to plate 84. While the switches illustrated are both open in the position shown in FIG. 3, and both closed when contact carrier 88 moves sufficiently toward contact plate 84 to engage the contacts thereon, the switches may be arranged so that one is closed and one is open, or both are closed in the condition of the boot and control mechanism shown in FIG. 3. For example, if two of the terminals are connected in a circuit to control a brake warning light, that switch would be open in FIG. 3. If the other two terminals were connected in a road speed control mechanism energizing circuit, that switch would be closed in FIG. 3. If this switch were in a road speed control system de-energizing circuit, the switch would be open in FIG. 3. It is, therefore, readily recognized that the operational status of each of the switches may be open or closed in the FIG. 3 position, and the status is merely reversed when the brakes are applied.

In the normal brake release position, the boot and control mechanism is positioned as shown in FIG. 3. Thus, the tube 76 maintains port 46 closed, and the switch mechanism 36 has both switches thereof in an open operational status. When the vehicle operator depresses the brake pedal to pivot the brake pedal lever about pivot 24 toward the position shown in dotted lines in FIG. 1, push rod 26 is moved axially forward, operating the booster valve mechanism to admit atmospheric air pressure into the chamber 54 through the valve mechanism and filter 60. The pressure differential acting on piston 50 and its associated diaphragm overcomes return spring 56 and moves the piston, including the piston extension 58, leftwardly as seen in FIG. 3. Spring 90 urges the inner housing 36 leftwardly due to its engagement with contact carrier 88 and acting through the probe 82 of flange section 72. Since the inner housing abutment 66 engages the end of piston extension 58, the leftward movement of the piston extension permits a following leftward movement of the inner housing 36 under the urging of spring 90. Upon sufficient leftward movement, the switches of switching mechanism 38 are closed, energizing the vehicle brake warning lights and de-energizing the vehicle road speed control system, if that system was in operation. At substantially the same time, or shortly thereafter, tube 76 has moved leftwardly with inner housing 36 sufficiently far to uncover port 46, thereby opening passage 44 to atmospheric air. This will dump any vacuum remaining in the control portions of the vacuum powered road speed control system, thus insuring deactivation of the system. Further leftward movement of piston extension 58, if the brakes are further applied, will occur relative to both inner housing 36 and the outer housing 34 since spring 90 has been extended as far as it is permitted because of engagement of contact carrier 88 with the fixed contact plate 84.

When the vehicle operator releases the brake pedal, the valve mechanism of the booster cuts off atmospheric air to chamber 54 and that chamber is again evacuated. Piston return spring 56 acts to move piston 50 rearwardly, thus moving piston extension 58 rearwardly, which is to the right as seen in FIG. 3. The rear end of piston extension 58 engages abutment 66, and since return spring 56 is much stronger than spring 90, the inner housing 36 is moved rearwardly with the piston extension. Spring 90 resiliently yields, the contact 88 moves away from contact plate 84, opening the switches of switch mechanism 38. Also, tube 76 moves with inner housing 36 to close port 46 as shown in FIG. 3.

What is claimed is:

1. In a brake operating mechanism including a brake booster having a fixed housing and a movable piston extension extending therefrom, a brake pedal, and a push rod extending axially into the piston extension and connecting the pedal and booster for controlled booster operation including axial movements of the piston extension in brake applying and brake releasing directions, the improvement of:

a booster boot and control mechanism comprising:
an outer housing member operatively secured to the fixed booster housing and receiving the piston extension and the push rod therethrough,
an inner housing member reciprocably received within said outer housing and receiving the piston extension therein and the push rod therethrough,
and resiliently biased switch means mounted in one of said housing members and resiliently urging said inner housing member in one axial direction into axially abutting engagement with the piston extension and yieldably opposing movement of the piston extension in the brake releasing direction within at least a part of the range of axial movements of the piston extension,
said switch means having a first operational status when overcome by sufficient movement of the piston extension in the brake releasing direction to establish a brake release condition, and having a second operational status different from its first operational status established when the piston extension is moved in the brake applying direction from a brake release position in accordance with operation of the brake booster with said inner housing member being moved therewith by the resiliently biased switch means.

2. In a brake operating mechanism including a brake booster having a fixed housing and a movable piston extension extending therefrom, a brake pedal, and a push rod extending axially into the piston extension and connecting the pedal and booster for controlled booster operation including axial movements of the piston extension in brake applying and brake releasing directions, the improvement of:

a booster boot and control mechanism comprising:
an outer housing member operatively secured to the fixed booster housing and receiving the piston extension and the push rod therethrough,
an inner housing member reciprocably received within said outer housing and receiving the piston extension therein and the push rod therethrough,
control valve means including a port element formed in one of said housing members and a port control element on the other of said housing members aligned with said port element, one of said elements being movable relative to the other of said elements with movement of said inner housing member relative to said outer housing member to open and close said port element,
and resiliently biased switch means mounted in one of said housing members and resiliently urging said inner housing member in one axial direction into axially abutting engagement with the piston extension and yieldably opposing movement of the piston extension in the brake releasing direction within at least a part of the range of axial movements of the piston extension,
said resiliently biased switch means having a first operational status when overcome by sufficient movement of the piston extension in the brake releasing direction to establish a brake release condition, and having a second operational status different from its first operational status established when the piston extension is moved in the brake applying direction from a brake release position in accordance with operation of the brake booster with said inner housing member being moved therewith by the resiliently biased switch means,
said control valve means port element being closed and opened substantially concurrent with changes in said switch means operational status.

* * * * *